(12) United States Patent
Amyotte (10) Patent No.: US 6,598,635 B2
(45) Date of Patent: Jul. 29, 2003

(54) APPARATUS FOR INSTALLING TIRE CHAINS

(75) Inventor: Cyril Marcel Amyotte, Mallaig (CA)

(73) Assignee: 906161 Alberta Ltd., Mallaig (CA)

( * ) Notice: Subject to any disclaimer, the term of this patent is extended or adjusted under 35 U.S.C. 154(b) by 0 days.

(21) Appl. No.: 09/995,941

(22) Filed: Nov. 28, 2001

(65) Prior Publication Data

US 2002/0066508 A1 Jun. 6, 2002

(30) Foreign Application Priority Data

Dec. 1, 2000 (CA) .............................................. 2327228

(51) Int. Cl.⁷ .............................................. B60C 11/00
(52) U.S. Cl. ...................................... 152/214; 152/217
(58) Field of Search ................................ 152/214, 215, 152/216, 217, 231

(56) References Cited

U.S. PATENT DOCUMENTS

| | | | | |
|---|---|---|---|---|
| 887,551 A | * | 5/1908 | Vanderbilt | 188/4 R |
| 1,211,597 A | * | 1/1917 | Kress | 152/214 |
| 1,288,620 A | * | 12/1918 | Langton | 152/214 |
| 1,399,700 A | * | 12/1921 | Dorsey | 152/214 |
| 1,517,495 A | * | 12/1924 | Craddock | 152/214 |
| 1,573,283 A | * | 2/1926 | Sutter | 152/214 |
| 2,746,507 A | * | 5/1956 | Morgan | 152/214 |
| 2,815,060 A | * | 12/1957 | Hellman | 152/214 |
| 3,965,956 A | * | 6/1976 | Whatley, Jr. | 152/214 |
| 4,227,562 A | * | 10/1980 | Adair | 152/214 |
| 4,487,314 A | | 12/1984 | Stewart | 206/216 |
| 5,020,396 A | | 6/1991 | Dunn | 81/15.8 |
| 5,219,466 A | | 6/1993 | Stout | 152/213 |
| 5,273,092 A | | 12/1993 | Simpson | 152/213 |
| 5,899,536 A | | 5/1999 | Decker | 301/42 |

* cited by examiner

Primary Examiner—S. Joseph Morano
Assistant Examiner—Long Bao Nguyen
(74) Attorney, Agent, or Firm—Davis & Bujold, P.L.L.C.

(57) ABSTRACT

A method and apparatus for installing tire chains including a support and a spool rotatably mounted to the support for rotation about a rotational axis. The support is attached to a vehicle. A tire chain is provided having a first end and a second end. The first end is detachably secured to the spool. When the spool rotates in a first direction the tire chain is wound onto the spool. When the spool is rotated in a second direction tire chain is fed from the spool. The second end of the tire chain is secured to a tire. As the tire rotates, tire chain is drawn from the spool and wrapped around the tire.

19 Claims, 15 Drawing Sheets

APPARATUS FOR INSTALLING TIRE CHAINS

FIELD OF THE INVENTION

The present invention relates to an apparatus for installing tire chains.

BACKGROUND OF THE INVENTION

When accumulations of snow or mud are encountered on a highway, truck drivers have an option of placing tire chains on the tires of their vehicles to improve tire traction. However, the process of placing tire chains onto vehicular tires in the snow or mud is such an unpleasant and time consuming task, that many truck drivers don't bother or unnecessarily delay placing tire chains on their tires. Accidents are occurring that could have been avoided had tire chains been installed in a timely fashion. If there was an apparatus that made it easier and faster to install tire chains, there would be less resistance by truck drivers to the early installation of tire chains.

SUMMARY OF THE INVENTION

What is required is an apparatus for installing tire chains that will facilitate faster and easier installation.

According to one aspect of the present invention there is provided an apparatus for installing tire chains includes a support and a spool rotatably mounted to the support for rotation about a rotational axis. Means is provided for attaching the support to a vehicle. Means is provided for securing a tire chain to the spool. When the spool rotates in a first direction the tire chain is wound onto the spool. When the spool is rotated in a second direction tire chain is fed from the spool. Means is provided for selectively rotating the spool in the first direction.

According to another aspect of the present invention there is provided a method for installing tire chains. A first step involves providing a support with a spool rotatably mounted to the support for rotation about a rotational axis. A second step involves attaching the support to a vehicle adjacent to a tire with the rotational axis of the spool in parallel spaced relation to the rotational axis of the tire. A third step involves providing a tire chain having a first end and a second end. A fourth step involves detachably securing a first end of the tire chain to the spool. When the spool rotates in a first direction the tire chain is wound onto the spool. When the spool is rotated in a second direction tire chain is fed from the spool. A fifth step involves securing the second end of the tire chain to a tire, such that, as the tire rotates, the spool rotates in the second direction and tire chain is drawn from the spool and wrapped around the tire.

According to a final aspect of the present invention there is provided a combination that includes a vehicle equipped with the apparatus described above. The vehicle has tires with each of the tires being rotatably mounted tires for rotation a rotational axis. A support is provided having a spool rotatably mounted to the support for rotation about a rotational axis. The support is mounted to the vehicle adjacent to one of the tires with the rotational axis of the spool in parallel spaced relation to the rotational axis of the tire. A tire chain is provided having a first end and a second end. The first end is detachably secured to the spool. When the spool rotates in a first direction the tire chain is wound onto the spool and when the spool is rotated in a second direction tire chain is fed from the spool. Means is provided for detachably securing the second end of the tire chain to a tire. Means is provided for selectively rotating the spool in the first direction.

According to the various aspects of the invention described above, tire chain is wound onto or fed from the spool. Once the basic teachings of the invention are understood there are various refinements that can be added to enhance performance. A locking mechanism can be added to lock the spool to the support in a selected rotational position, and thereby prevent tire chain from inadvertently being fed from the spool. There are various configurations of locking mechanism that are workable. Beneficial results have been obtained through the use of a ratchet gear and a locking member that engages the ratchet gear.

There are various means by which tire chain may be secured to the spool. Beneficial results have been obtained when the spool has a central shaft with several hooks that serve as means for detachably securing the first end of the tire chain to the spool. Similarly, there are various means by which one could selectively rotate the spool in the first direction. Beneficial results have been obtained through the use of torsion spring. Other mechanism, such as a simple external crank, could also be used.

There are various means for securing tire chain onto a tire. A choker chain form of attachment is commonly used in the industry. Choker chains cannot be used with some dual wheel configurations, as there is insufficient clearance. To address this problem an alternative attachment device was specifically developed as part of the present invention for use with dual wheels. This attachment device is a generally "T" shaped member consisting of two pivotally connected bodies. Each of the bodies has a main shaft with a first end and a second end. The main shafts are pivotally secured in parallel spaced relation by at least one band. Arms project outwardly from the first end of each main shaft. Feet project outwardly from the second end of each main shaft in parallel spaced relation to the arms. Loops are positioned at spaced intervals along the arms and serve as means for attaching tire chains to the "T" shaped member. With a single tire, the use of a choker chain with clips is preferred.

Although beneficial results may be obtained through the use of the invention, as described above, there unavoidably remains the need to initially attach the second end of the tire chain to the tire. It has been determined that this job is becomes much easier when the vehicle has pivotally mounted fenders. The fenders pivot out of the way to provide better access to the tires when securing the second end of the tire chain to the tires.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred embodiment, an apparatus for installing tire chains generally identified by reference numeral 10, will now be described with reference to FIGS. 1 through 18.

Structure and Relationship of Parts

Figure 1:
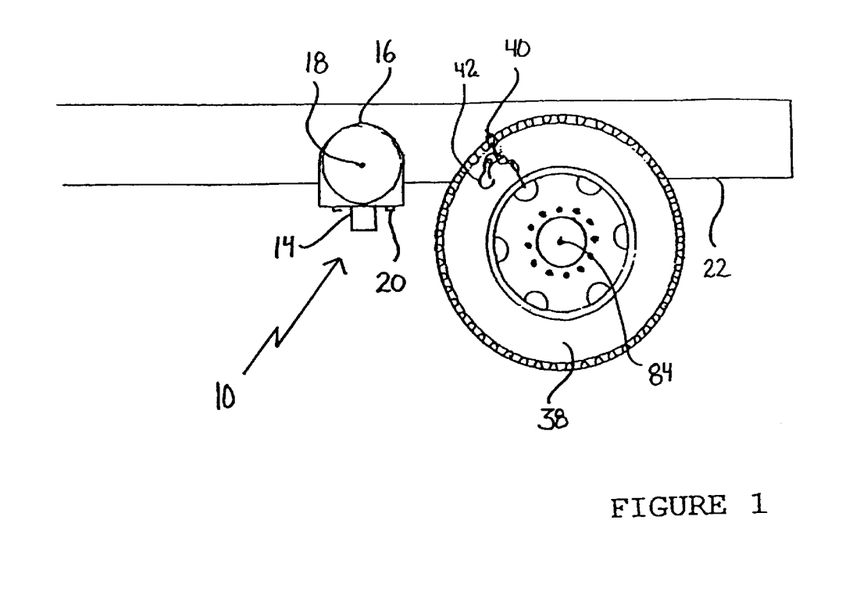
FIG. 1 is a first side elevation view of a vehicle equipped with an apparatus for installing tire chains constructed in accordance with the teachings of the present invention.
Figure 3:
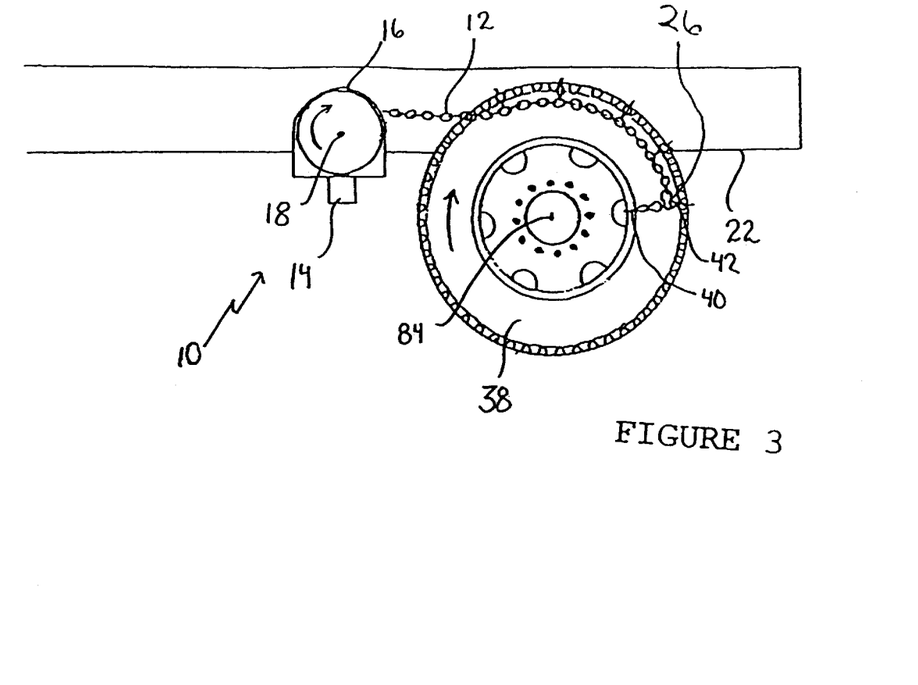
FIG. 3 is a third side elevation view of the vehicle equipped with an apparatus for installing tire chains illustrated in FIG. 1.

Referring to FIG. 1, there is provided an apparatus 10 for installing tire chains 12 that includes a support 14 and a spool 16. Spool 16 is rotatably mounted to support 14 for rotation about a rotational axis 18. Means are provided for attaching support 14 to a vehicle 22. In the illustrated embodiment, bolts 20 are used as the means to attach support 14 to vehicle 22, however it will be appreciated that other means will also serve the intended function. Referring to FIG. 3, tire chain 12 has a first end 24 and a second end 26.

Figure 9:
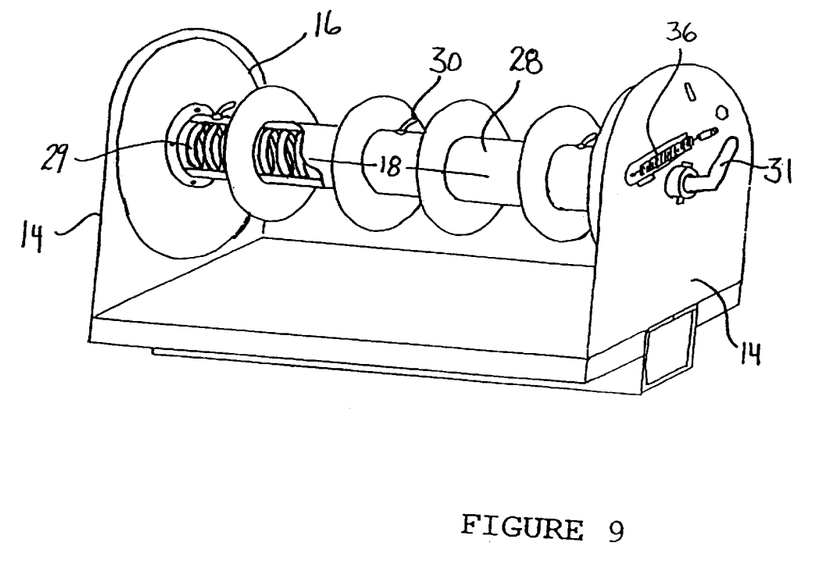
FIG. 9 is a perspective view of spool and support, partially in section, from the apparatus for installing tire chains illustrated in FIG. 1.
Figure 10:
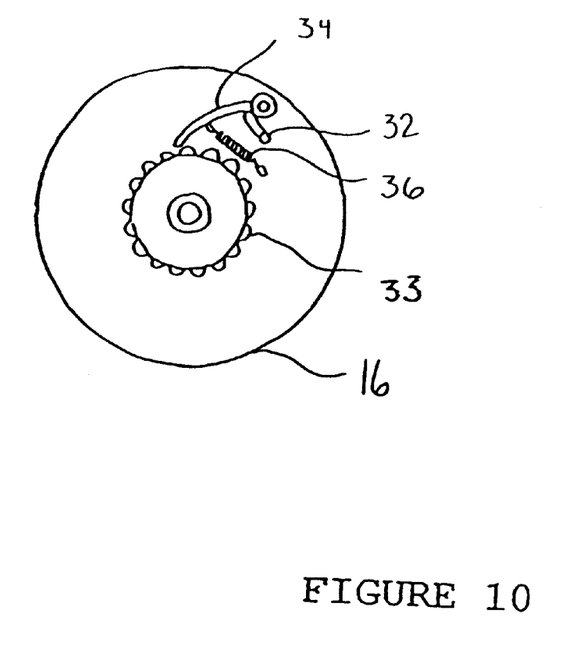
FIG. 10 is an end elevation view, in section, of the spool and support illustrated in FIG. 9.
Figure 11:
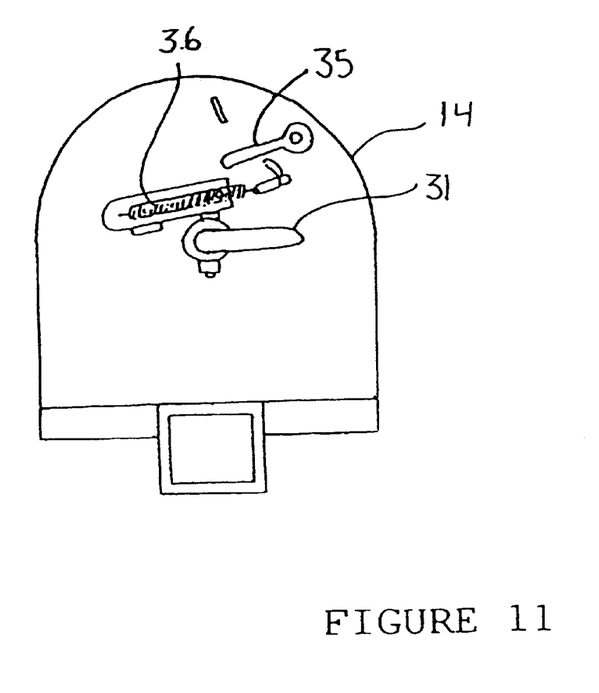
FIG. 11 is an end elevation view of the spool and support illustrated in FIG. 9.

Referring to FIG. 9, spool 16 has a central shaft 28 with several hooks 30. Hooks 30 serve as a means for detachably securing first end 24 of tire chain 12 to spool 16. First end 24 of tire chain 12 is detachably secured to spool 16 so that when spool 16 rotates in a first direction, tire chain 12 is wound onto spool 16 and when spool 16 is rotated in a second direction, tire chain 12 is fed from spool 16. Central shaft 28 has an internal torsion spring 29 that serves to keep torsion on spool 16 when vehicle 22 backs up with tire chain 12 attached, such that tire chain 12 is wound back up on spool 16 when disengaged from tire 38. Referring to FIG. 11, in the alternative, an external crank 31 may be used for selectively rotating spool 16 in the first direction. Referring to FIG. 10, a locking mechanism 32 is provided to lock spool 16 to support 14 in a selected rotational position. Locking mechanism 32 includes a ratchet gear 33 and a locking member 34 that engages ratchet gear 33. An external handle 35 is used with a spring 36 to bias locking member 34 against ratchet gear 33.

Figure 2:
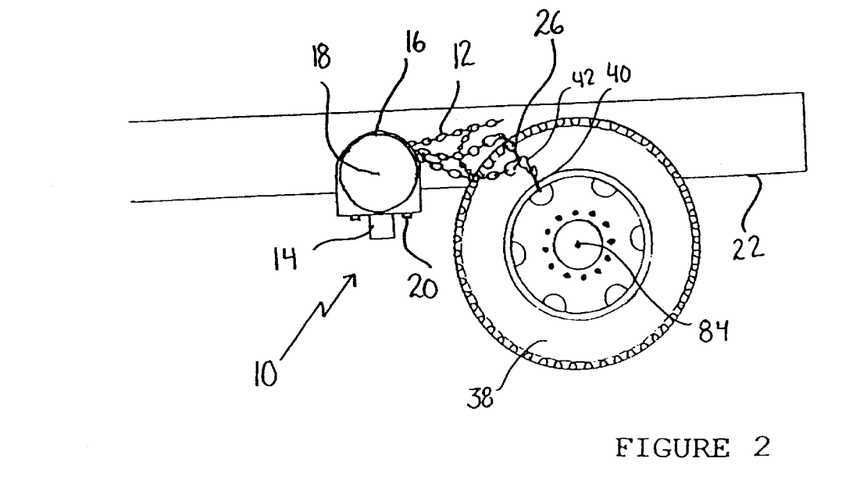
FIG. 2 is a second side elevation view of the vehicle equipped with an apparatus for installing tire chains illustrated in FIG. 1.
Figure 5:
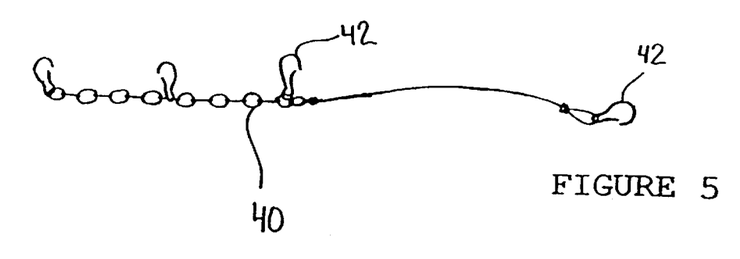
FIG. 5 is detailed side elevation view of a choker chain with clips used to attach a tire chain a tire as illustrated in FIGS. 1 through 4.
Figure 6:
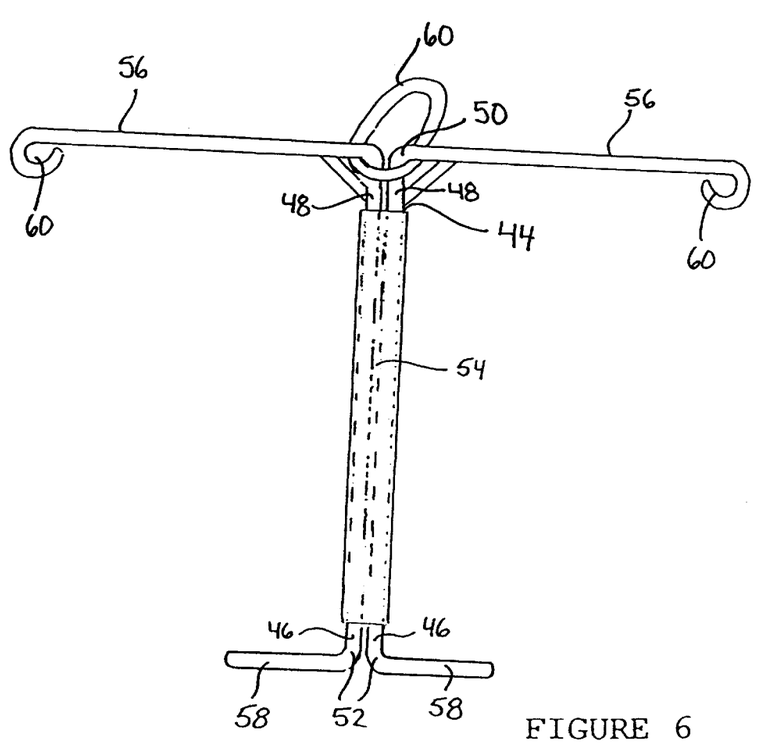
FIG. 6 is a front elevation view of a "T" shaped member for attaching a tire chain to a tire, in an open position.
Figure 8:
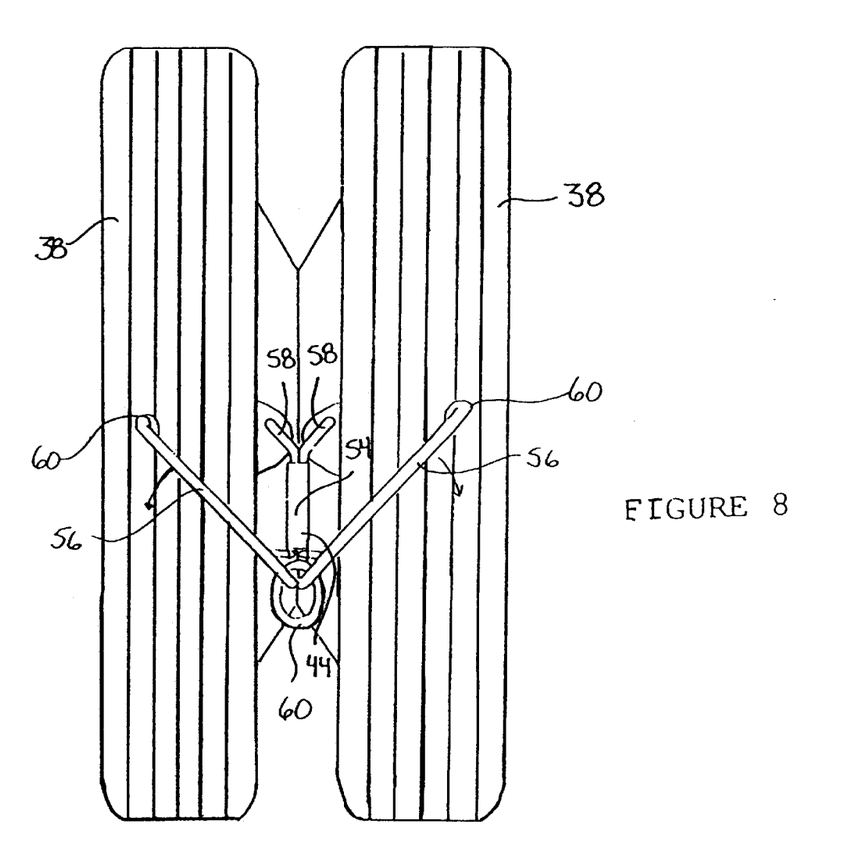
FIG. 8 is a front elevation view of the "T" shaped member illustrated in FIGS. 6 and 7, in the process of being attached to dual wheels.

Referring to FIG. 2, in order to install tire chain 12 from spool 16 onto a tire 38, second end 26 of tire chain 12 must be secured to tire 38. There are various means for securing second end 26 of tire chain 12 to tire 38. Referring to FIG. 5, a choker chain 40 with clips 42 can be used for detachably securing second end 26 of tire chain 12 to a single tire 38 or dual tires. Referring to FIG. 8, when there is insufficient clearance to use choker chain 40, a "T" shaped member 44 can be used. Referring to FIG. 6, "T" shaped member 44 consists of two pivotally connected bodies 46. Each of bodies 46 has a main shaft 48 with a first end 50 and a second end 52. Main shafts 48 are pivotally secured in parallel spaced relation by a one band 54. Arms 56 project outwardly from first end 50 of each main shaft 48. Feet 58 project outwardly from second end 52 of each main shaft 48 in parallel spaced relation to arms 56. Attachment loops 60 for attaching tire chains 12 to "T" shaped member 44 are positioned at spaced intervals along arms 56.

Figure 12:
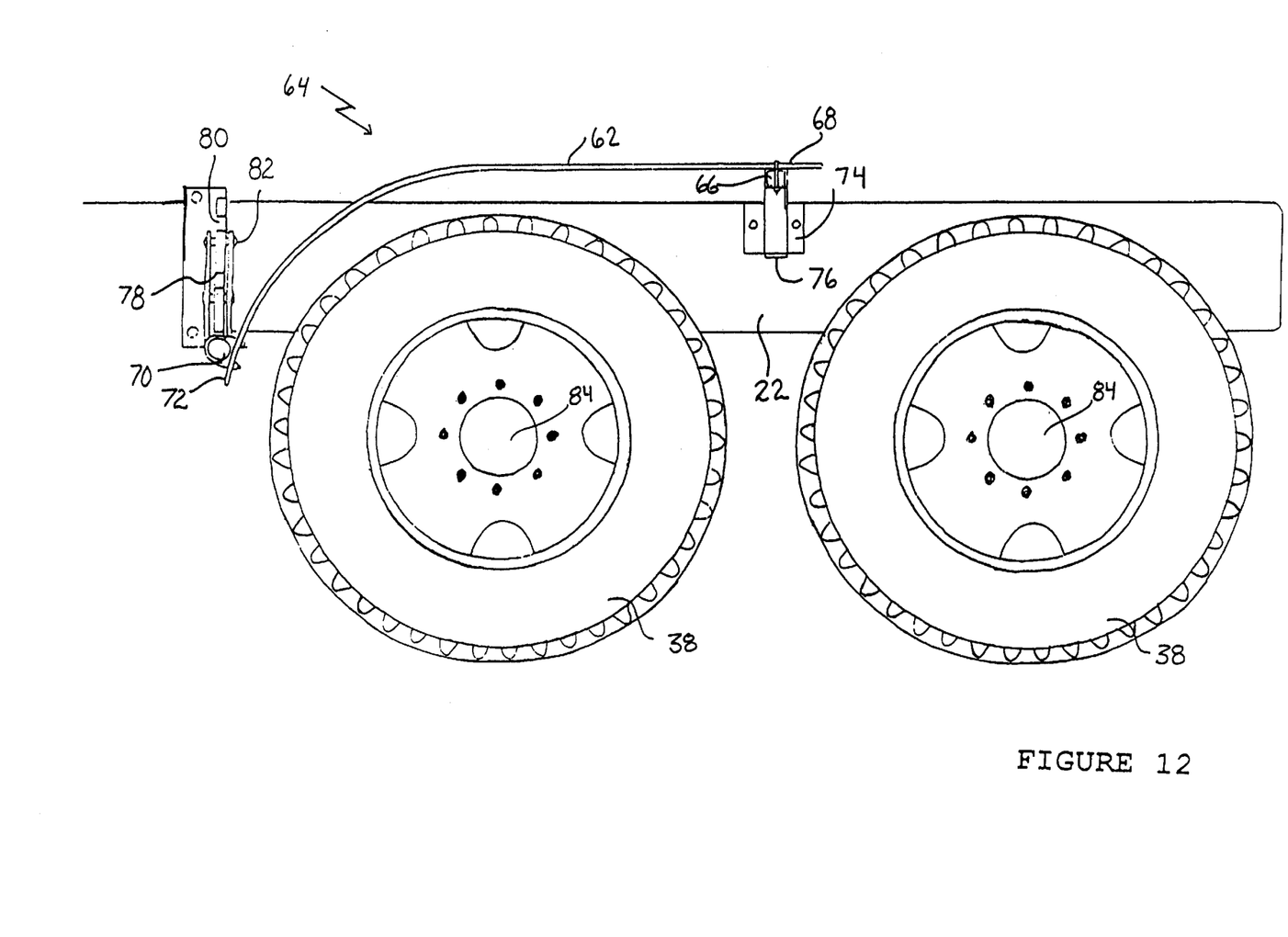
FIG. 12 is a side elevation view of a vehicle equipped with swing away fender in accordance with the teachings of the present invention.
Figure 13:
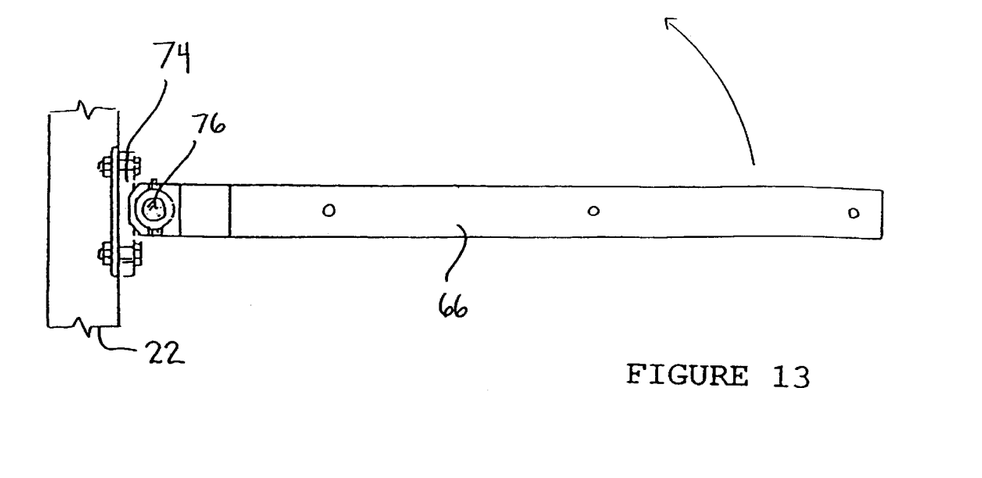
FIG. 13 is a top plan view of the swing away fender illustrated in FIG. 12.
Figure 14:
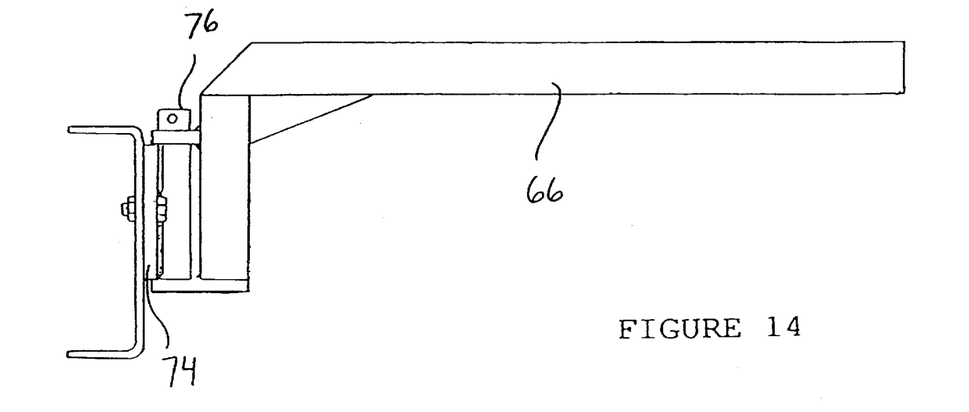
FIG. 14 is a side elevation view of the swing away fender illustrated in FIG. 12.
Figure 15:
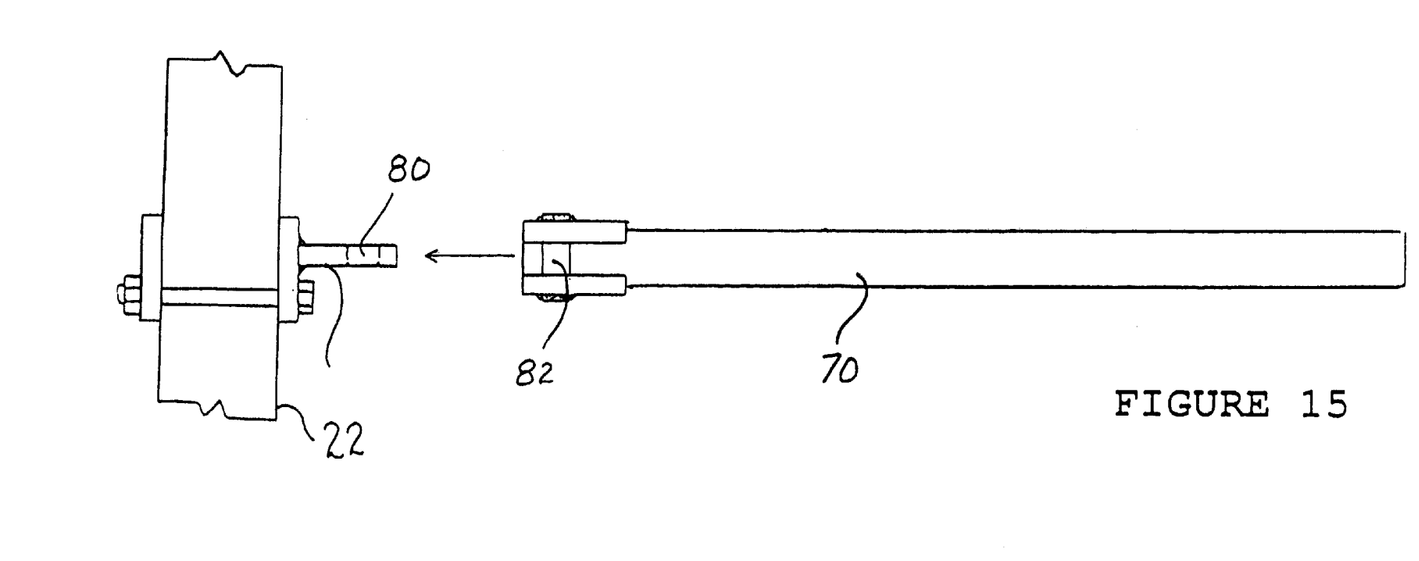
FIG. 15 is an exploded detailed top plan view of a detachable end of the swing away fender illustrated in FIG. 12.
Figure 16:
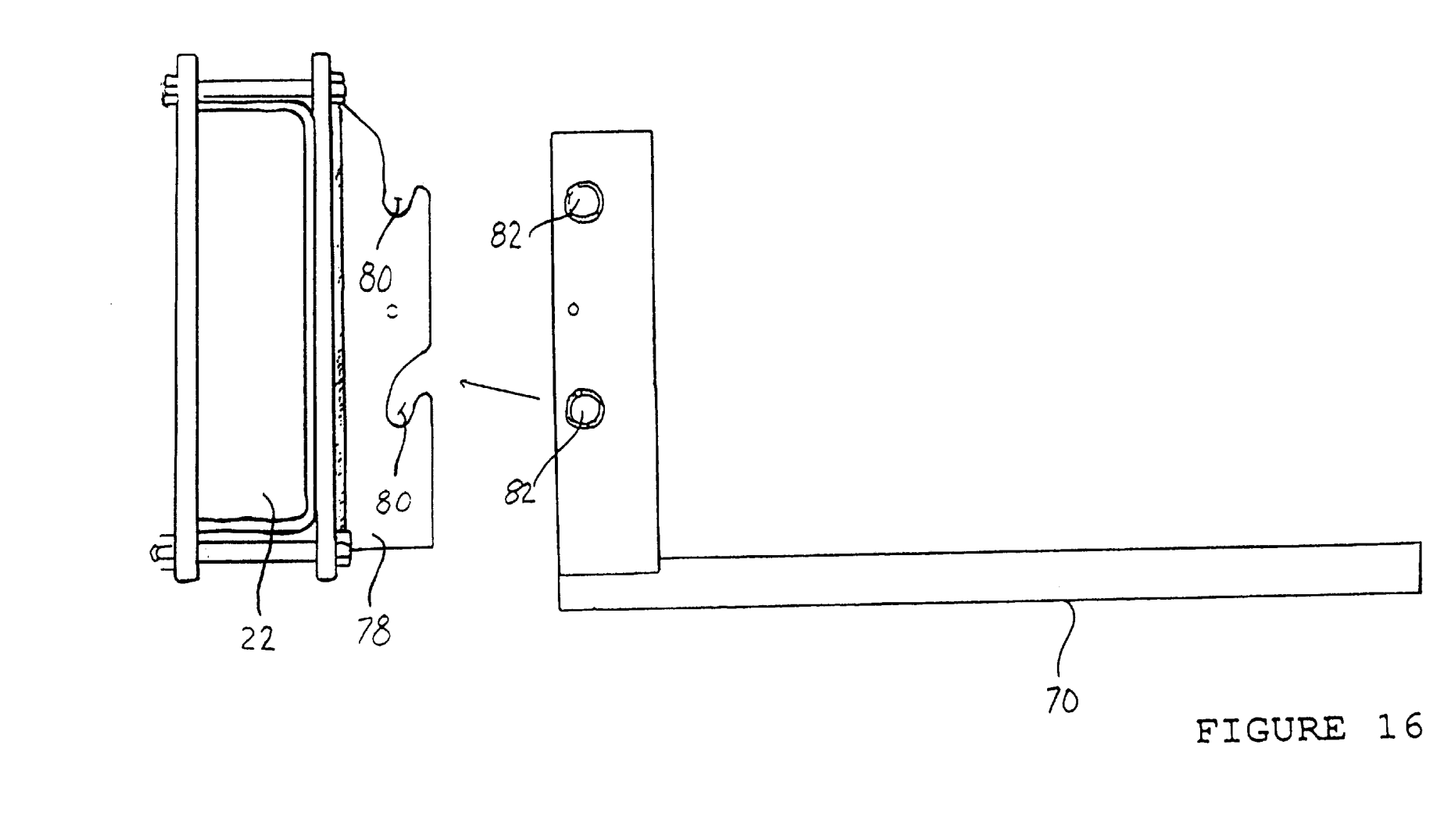
FIG. 16 is an exploded detailed side elevation view of a detachable mounting for the detachable end of the swing away fender illustrated in FIG. 12.
Figure 17:
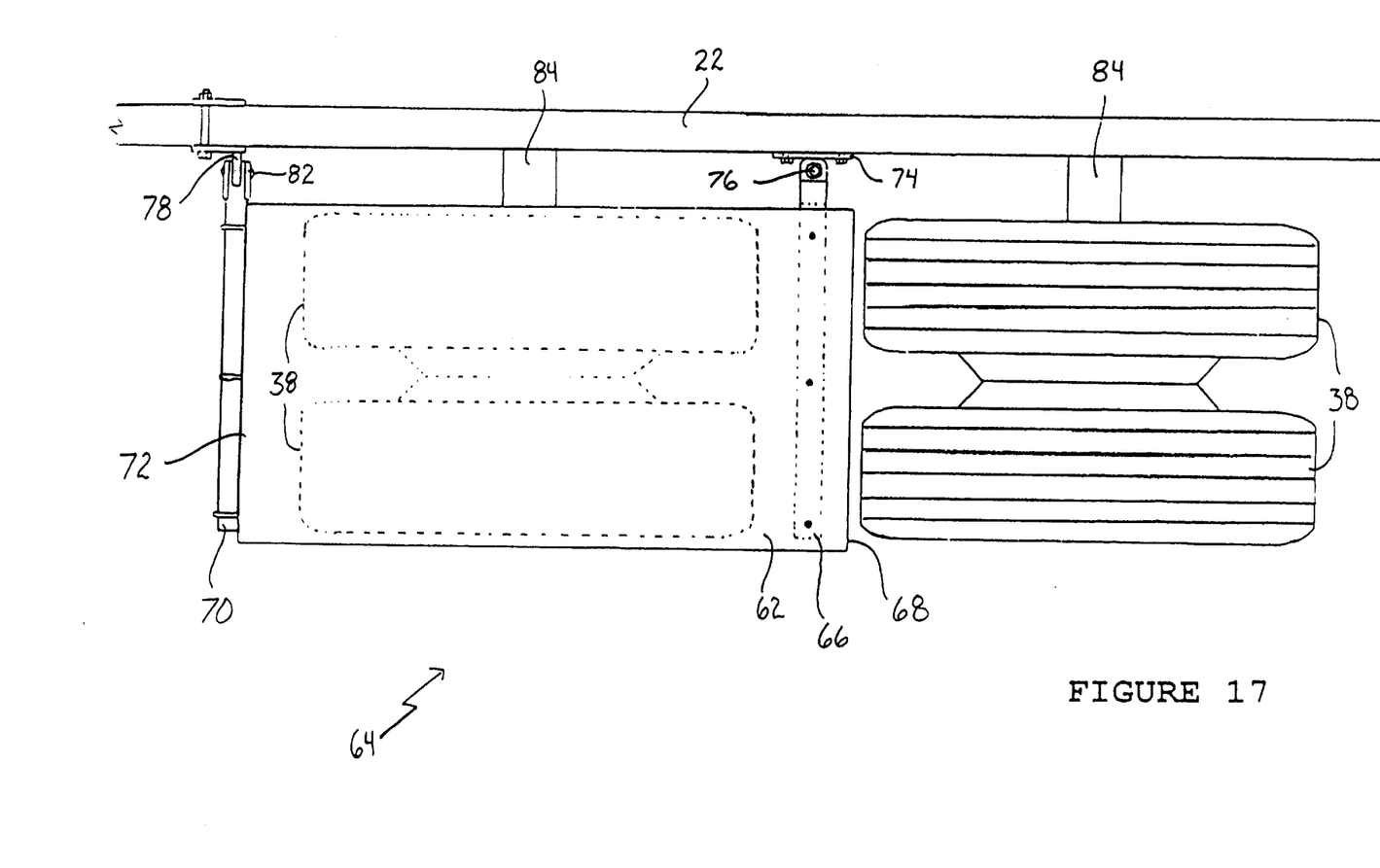
FIG. 17 is a top plan view of the vehicle equipped with the swing away fender illustrated in FIG. 12.
Figure 18:
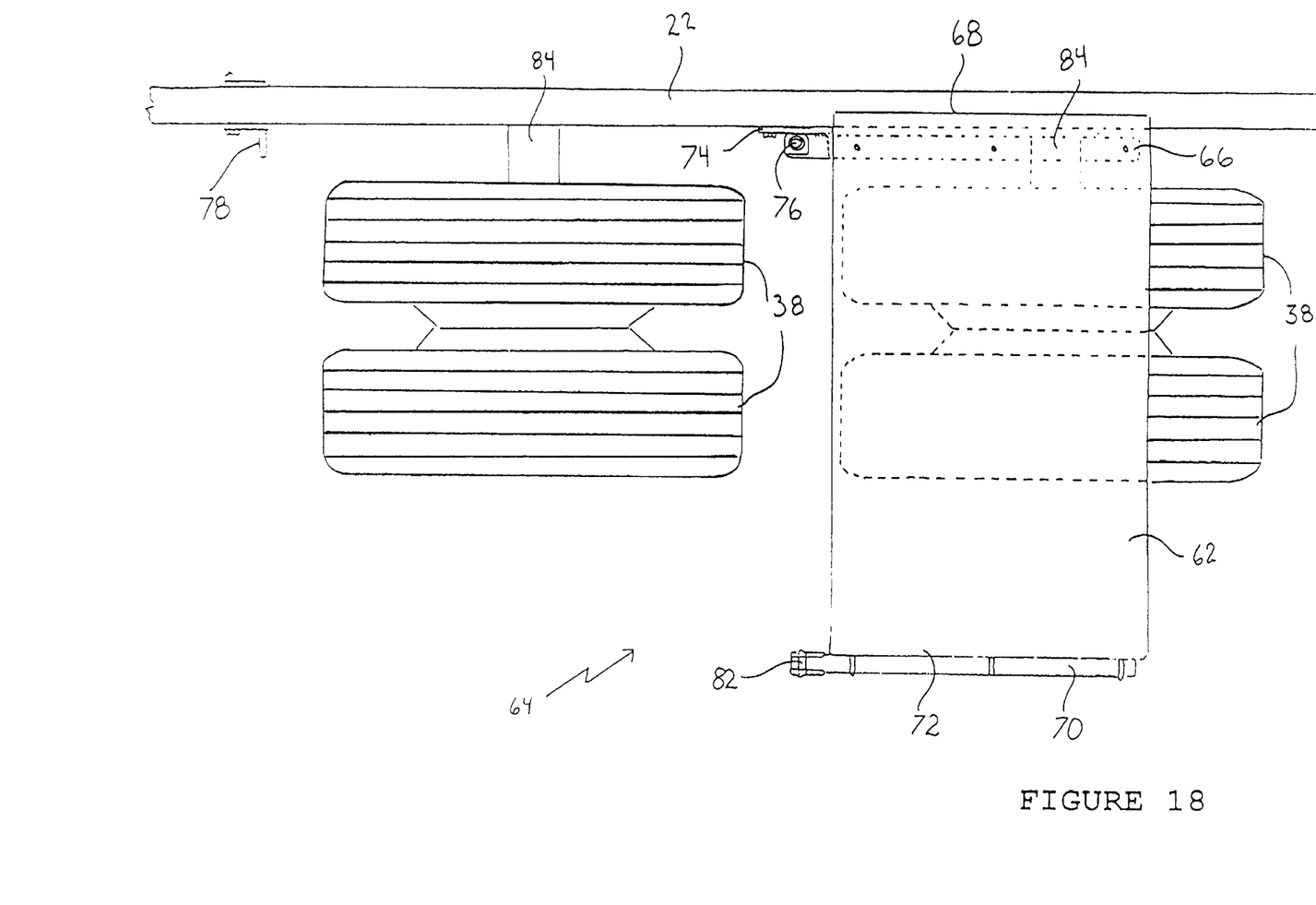
FIG. 18 is a top plan view of the vehicle equipped with the swing away fender illustrated in FIG. 12, with the fender swung away to provide better access to the tire.

Referring to FIG. 12, it is easier to attach second end 26 of tire chain 12 to tire 38 when vehicle 22 has pivotally mounted fenders 62. Referring to FIG. 17, there is provided a fender mounting generally referenced by numeral 64 for vehicle 22. Fender mounting 64 includes a first fender support 66 adapted to be secured to and support a first end 68 of fender 62 and a second fender support 70 adapted to be secured to and support a second end 72 of fender 62. Referring to FIGS. 13 and 14, means for pivotally securing first fender support 66 to vehicle 22 is a mounting plate 74 with a pivoting pin 76. Referring to FIG. 12, means for detachably securing second fender support 70 to vehicle 22 such that second fender support 70 is detachable from vehicle 22 to permit fender 62 to pivot with first fender support 66 is a locking mechanism 78. Referring to FIG. 12, locking mechanism 78 is positioned on vehicle 22 and is adapted to detachably secure second fender support 70 of fender 62 against vehicle 22. Referring to FIGS. 15 and 16, in the illustrated embodiment, locking mechanism 78 has two receiving spaces 80 which are adapted to receive two transverse pins 82 positioned on second fender support 70, although it will be appreciated that there are other means of detachably securing second fender support 70 of fender 62 to vehicle 22. Referring to FIG. 18, in the illustrated embodiment, raising second fender support 70 of fender 62 releases transverse pins 82 from receiving spaces 70 thereby permitting first fender support 66 to pivot sideways and moving second end 72 end of fender 62 way from vehicle 22 to provide easy access to tire 38.

Operation

Referring to FIGS. 1 through 18 there is illustrated a method for installing tire chains 12. Referring to FIG. 1, a first step involves providing support 14 with spool 16 as described above. Referring to FIG. 2, the next step involves attaching support 14 to vehicle 22 adjacent to tire 38 with rotational axis 18 of spool 16 in parallel spaced relation to rotational axis 84 of tire 38.

Figure 4:
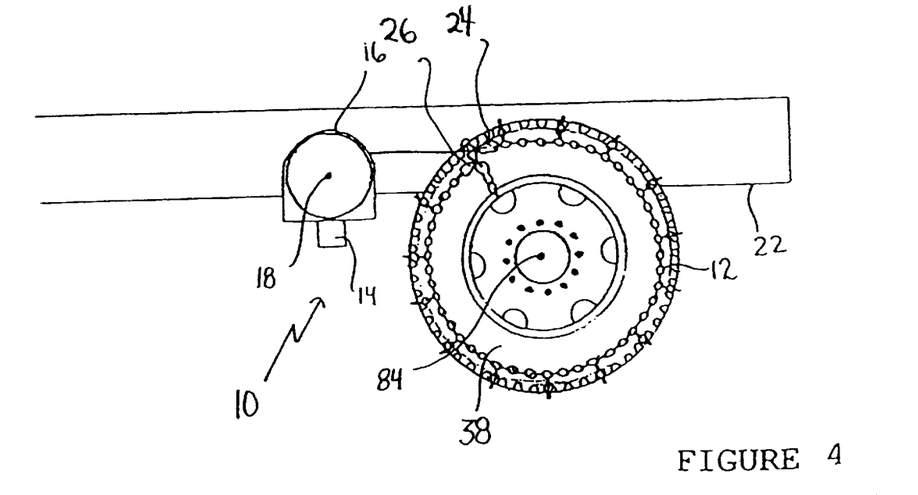
FIG. 4 is a third side elevation view of the vehicle equipped with an apparatus for installing tire chains illustrated in FIG. 1.

Referring to FIGS. 2 through 4, a further step involves providing tire chain 12 as described above, and detachably securing first end 24 of tire chain 12 to hooks 30 on central shaft 28 of spool 16, such that when spool 16 rotates in a first direction, tire chain 12 is wound onto spool 16 and when spool 16 is rotated in a second direction tire chain 12 is fed from spool 16.

Referring to FIG. 18, a next step involves pivoting fender 62 away from vehicle 22 to provide better access to tire 38. To pivot fender 62 away from vehicle 22, second fender support 70 of fender 62 must raised so as disengage second fender support 70 of fender 62 from locking mechanism 78 on vehicle 22. Referring to FIGS. 1 through 3 second end 26 of tire chain 12 is then secured to tire 38, such that, as tire rotates 38, spool 16 rotates in a second direction and tire chain 12 is drawn from spool 16 and wrapped around tire 38.

Figure 7:
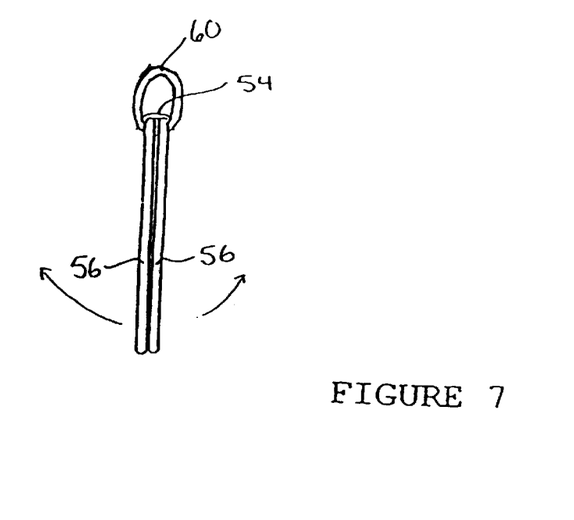
FIG. 7 is a top plan view of a "T" shaped member for attaching a tire chain to a tire illustrated in FIG. 6, in a closed position.

Referring to FIG. 1, second end 26 of tire chain 12 can be secured to tire 38 by using choker chain 40. Choker chain 40 is wrapped around tire 38 and then clips 42 are joined to each other to secure chocker chain 40 on tire 38 and to join choker chain 40 to second end 26 of tire chain 12. Choker chain 40 serves to secure second end 26 of tire chain 12 in position on tire 38 so that as tire 38 rotates, spool 16 rotates in the second direction and tire chain 12 is drawn from spool 16 and wrapped around tire 38. Referring to FIG. 8, when vehicle 22 has dual tire 38 arrangement and there is no clearance to permit the use of choker chain 40, an alternative means such as "T" shaped member 44 can be used. Referring to FIG. 7, bodies 46 of "T" shaped member 44 are then positioned so that arms 56 and feet 58 of each body 46 are parallel and adjacent each other. This positioning of arms 56 and feet 58, permits second end 52 of "T" shaped member 44 to be inserted between dual tires 38. Arms 56 and feet 58 of bodies 46 are adjusted so that arms 56 and feet 58 of bodies 46 swing out to engage with tires 38 on either side of "T" shaped member 44. Referring to FIG. 6, second end 26 of tire chain 12 is attached to attachment loops 60 on arms 56 of "T" shaped member 44. Referring to FIGS. 2 through 3, "T" shaped member 44 then secures second end 26 of tire chain 12 in place on tires 38, so that as tires 38 rotate, spool 16 rotates in the second direction and tire chain 12 is drawn from spool 16 and wrapped around tires 38.

When tire chains 12 are to be removed, the process is reversed. As tires 38 rotate, torsion spring 29 serves to rotate spool 16 in the first direction drawing tire chains 12 back onto spool 16.

Alternative Embodiments

Figure 19:
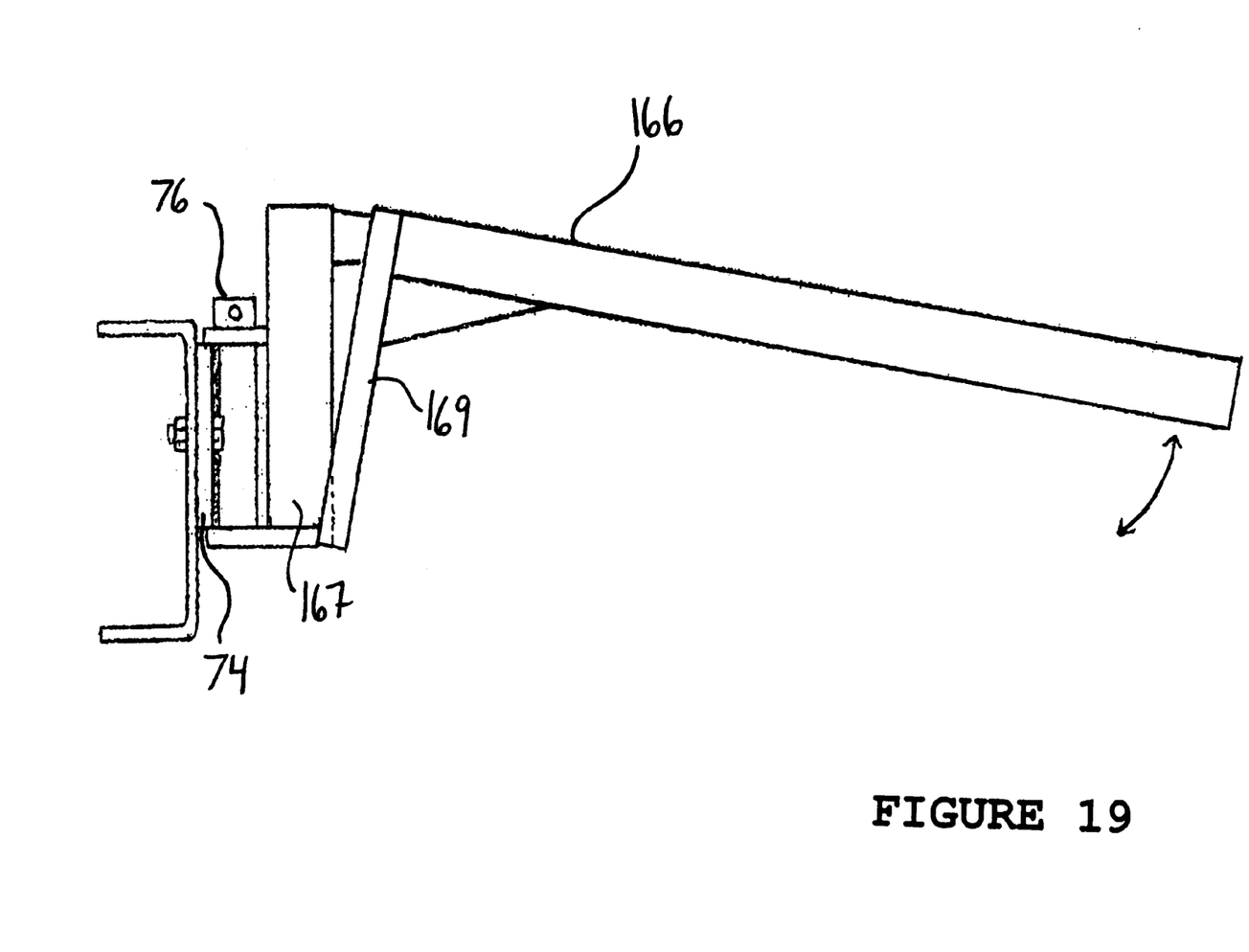
FIG. 19 is a side elevation view an alternative embodiment of the swing away fender.
Figure 20:
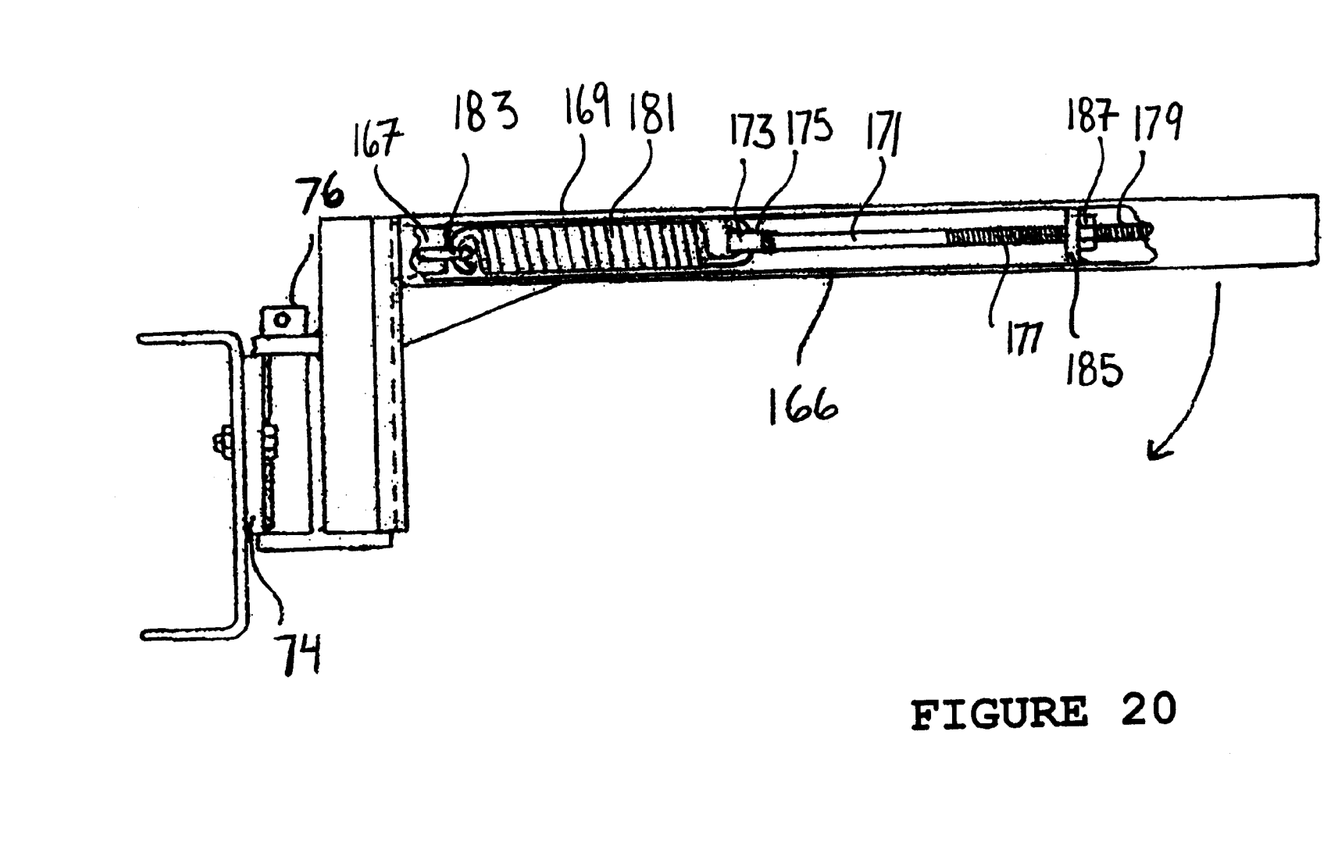
FIG. 20 is a side elevation view, in section, of the alternative embodiment of the swing away fender.

Pivoting fenders 62 have now been subject to use on several vehicles. During the course of such use it was realized the amount of abuse that pivoting fenders 62 must withstand. To give an extreme example, one vehicle left the road and rolled in a ditch. It is, therefore, recommended that pivoting fenders 62 be constructed in a manner that will enable them to withstand impacts. Referring to FIG. 19, there is illustrated a fender support 166 which has been modified to enable limited movement. Referring to FIG. 20, this movement is made possible by providing fender support 166 with a fixed portion 167 and a movable portion 169. Movable portion 169 is secured to fixed portion 167 by mounting assembly that includes a shaft 171 which has an eyelet 173 at a first end 175 and has threads 177 at a second end 179. A spring 181 engages eyelet 173 at first end 175 of shaft 171 and a similar eyelet 183 forming part of fixed portion 167. Second end 179 of shaft 171 is inserted through an integral bracket 185 within movable portion 169 of fender support 166. A nut 187 engages threads 177 at second end 179 of shaft 171 to hold the mounting assembly together. When a force is exerted upon movable portion 169 of fender support 166, spring 181 permits limited movement. When the force is removed, spring 181 draws movable support 169 back to its resting position.

Figure 21:
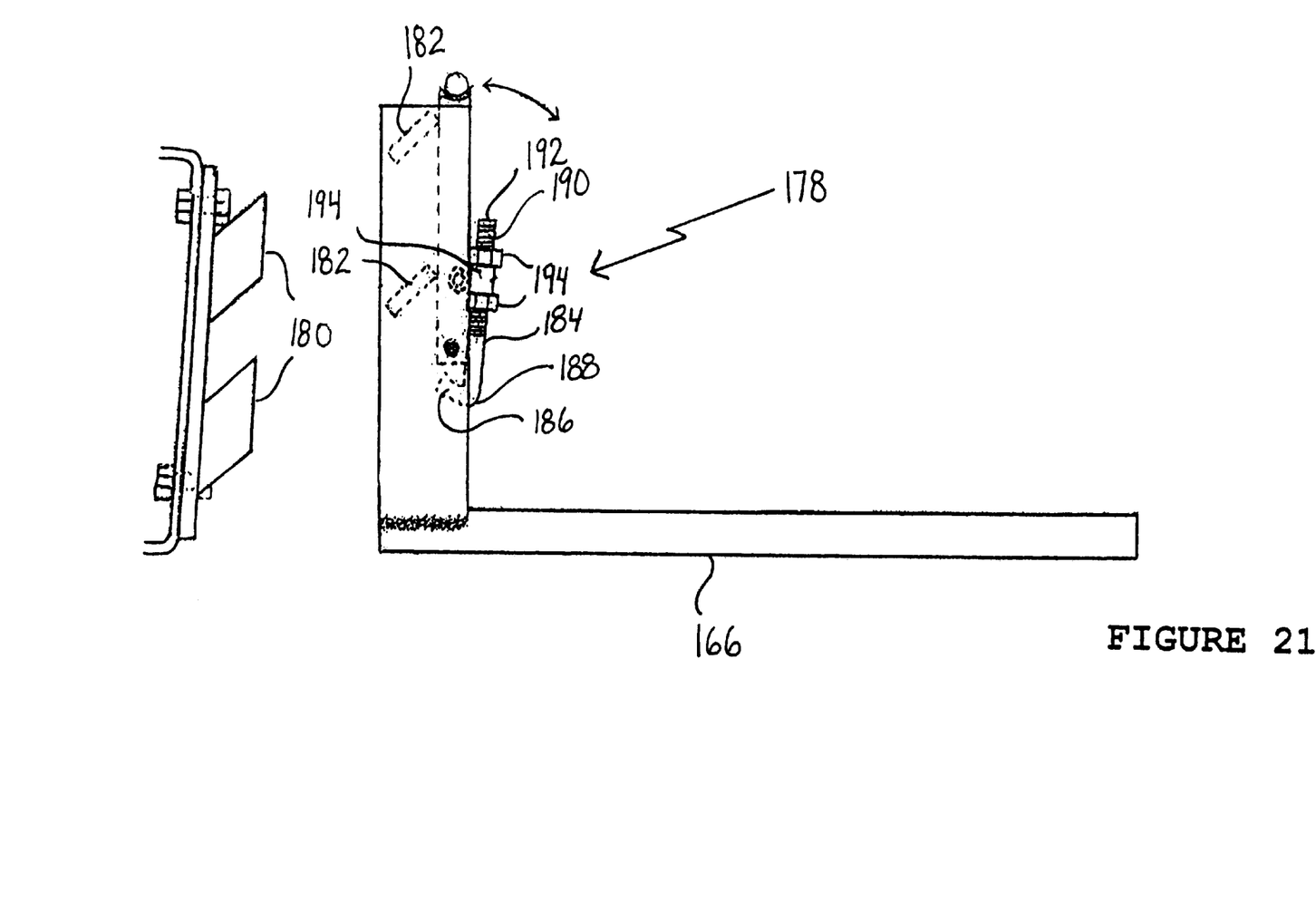
FIG. 21 is an exploded detailed side elevation view of an alternative embodiment of detachable mounting for the detachable end of the swing away fender.

It was determined that locking mechanism 78 as illustrated in FIG. 16 showed wear and movement after a prolonged period of use. It was, therefore, determined that it would be preferable if some means were provided to tighten locking mechanism 78 as wear occurred. Referring to FIG. 21, there is illustrated an alternative form of locking mechanism, generally identified by reference numeral 178. Locking mechanism 178 has angular interlocking engagement members 180 and 182. A latching member 184 is provided to maintain engagement members 180 and 182 engaged. Latching member 184 has a hook 186 at a first end 188 and threads 190 at a second end 192. Second end 192 is inserted into a sleeve 194 which is secured to fender support 166. Second end 192 is secured in position relative to sleeve 194 by two nuts 196. Nuts 196 engage threads 190 to clamp sleeve 194. As wear occurs, the relative position of latching member 184 can be adjusted by altering the position of nuts 196.

It will be appreciated by a person skilled in the art that the method described above, facilitates faster and easier installation and removal of tire chains 12 on vehicles with either single tire 38 or dual tire 38 arrangements.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An apparatus for installing tire chains, comprising:

a support;

a spool rotatably mounted to the support for rotation about a rotational axis, the spool having a central shaft with several hooks;

means for attaching the support to a vehicle;

the hooks serving as means for detachally securing a first end of a tire chain to the spool, such that when the spool rotates in a first direction the tire chain is wound onto the spool and when the spool is rotated in a second direction tire chain is fed from the spool; and means for selectively rotating the spool in the first direction.

2. The apparatus as defined in claim 1, wherein a locking mechanism is provided to lock the spool to the support in a selected rotational position.

3. The apparatus as defined in claim 2, wherein the locking mechanism included a ratchet gear and a locking member that engages the ratchet gear.

4. The apparatus as defined in claim 1, wherein the means for selectively rotating the spool in the first direction is an external crank.

5. The apparatus as defined in claim 1, wherein the means for selectively rotating the spool in the first direction is a torsion spring.

6. An apparatus for installing tire chains, comprising:
   a support;
   a spool rotatably mounted to the support for rotation about a rotational axis;
   means for attaching the support to a vehicle;
   means for detachably securing a first end of a tire chain to the spool, such that when the spool rotates in a first direction the tire chain is wound onto the spool and when the spool is rotated in a second direction tire chain is fed from the spool;
   a torsion spring biasing the spool for rotation in the first direction; and
   means for detachably securing a second end of the tire chain to a tire.

7. The apparatus as defined in claim 6, wherein the means for detachably securing the second end of the tire chain to a tire is a choker chain with clips.

8. The apparatus as defined in claim 6, wherein the means for detachably securing the second end of the tire chain to a tire is a generally "T" shaped member consisting of two pivotally connected bodies, each of the bodies has a main shaft with a first end and a second end, the main shafts are pivotally secured in parallel spaced relation by at least one band, arms project outwardly from the first end of each main shaft, feet project outwardly from the second end of each main shaft in parallel spaced relation to the arms, means for attaching tire chains are positioned at spaced intervals along the arms.

9. The apparatus as defined in claim 8, wherein the means for attaching tire chains are attachment loops.

10. In combination:
    a vehicle having tires each of the tires being rotatably mounted tires for rotation a rotational axis;
    a support having a spool rotatably mounted to the support for rotation about a rotational axis, the support being mounted to the vehicle adjacent to one of the tires with the rotational axis of the spool in parallel spaced relation to the rotational axis or the tire;
    a tire chain having a first end and a second end, the first end being detachably secured to the spool, such that when the spool rotates in a first direction the tire chain is wound onto the spool and when the spool s rotated in a second direction tire chain is fed from the spool;
    means for detachably securing the second end of the tire chain to a tire;
    means for selectively rotating the spool in the first direction; and
    the vehicle having at least one pivotally mounted fender which pivots out of the way to provide better access to a selected one of the tires for detachably securing the second end of the tire chain to the selected tire.

11. The combination as defined as claim 10, wherein the at least one pivotally mounted fender includes:
    a first fender support adapted to be secured to and support a first end of a fender;
    a second fender support adapted to be secured to and support a second end of the fender;
    means for pivotally securing the first fencer support to a vehicle;
    means for detachably securing the second fender support to a vehicle, such that the second fender support is detachable from the vehicle to permit the fender to pivot with the first fender support.

12. The combination as defined in claim 10, wherein at least one of the first fender support and the second fender support is spring mounted.

13. The combination as defined in claim 10, wherein the means for detachably securing the second fender support to the vehicle includes first engagement means that engages second engagement means.

14. The combination as defined in claim 10, wherein an adjustable latch mechanism is provided to maintain the first engagement means and the second engagement means engaged.

15. A fender mounting for a vehicle, comprising:
    a first fender support adapted to be secured to and support a first end of a fender;
    a second fender support adapted to be secured to and support a second end of the fender;
    means for pivotally securing the first fender support to a vehicle;
    means for detachably securing the second fender support to a vehicle, such that the second fender support is detachable from the vehicle to permit the fender to pivot with the first fender support.

16. The fender mounting as defined in claim 15, wherein at least one of the first fender support and the second fender support is spring mounted.

17. The fender mounting as defined in claim 15, wherein the means for detachably securing the second fender support to the vehicle includes first engagement means that engages second engagement means.

18. The fender mounting as defined in claim 17, wherein a latch mechanism is provided to maintain the first engagement means and the second engagement means engaged, the latch mechanism being adjustable to accommodate wear.

19. An apparatus for attaching a tire chain to a dual wheels, comprising:
    a generally "T" shaped member consisting of two pivotally connected bodies, each of the bodies:
    a main shaft with a first end and a second end, the main shafts being pivotally secured in parallel spaced relation by at least one band;
    arms projecting outwardly from the first end of each main shaft;
    feet projecting outwardly from the second end of each main shaft in parallel spaced relation to the arms; and
    means for attaching tire chains positioned at spaced intervals along the arms.

* * * * *